Dec. 6, 1938. H. H. COLLINS Re. 20,934

UTILITY PLATE

Original Filed June 21, 1934

Inventor:
Henry H. Collins
by his Attorneys
Howson & Howson

Reissued Dec. 6, 1938

Re. 20,934

UNITED STATES PATENT OFFICE 20,934

UTILITY PLATE

Henry Hill Collins, Bryn Mawr, Pa.

Original No. 2,032,835, dated March 3, 1936, Serial No. 731,745, June 21, 1934. Application for reissue October 23, 1937, Serial No. 170,629

2 Claims. (Cl. 65—15)

This invention relates to a novel form of utility plate comprising a substantially rigid base form which by reason of the novel characteristics hereinafter set forth may be and preferably is made of relatively cheap material and which is adapted to efficiently retain a cover element of thin flexible material such as paper forming the effective food-retaining surface of the plate.

A specific object of the invention is to provide a plate of this character wherein the base member shall be substantially concealed and shall thereby constitute an unobtrusive part of the plate assembly while at the same time affording a highly efficient rigid backing and retainer for the flexible cover element.

To this specific end, another object of the invention is to provide a plate structure of the stated character in which the substantially rigid base member shall retain the cover element by means only of frictional engagement at the edges of the last-named element, whereby the requirement for obtrusive overhanging flange elements or unsightly projections on the base member is obviated.

A still further object of the invention is to provide a plate of the stated character wherein the cover element while securely retained in the base member shall be readily removable.

Another object of the invention is to provide a plate of the stated character in which the base member, while having the desirable characteristics set forth above, shall be free from inaccessible recesses interfering with adequate cleansing and maintenance in sanitary condition.

Figure 1:
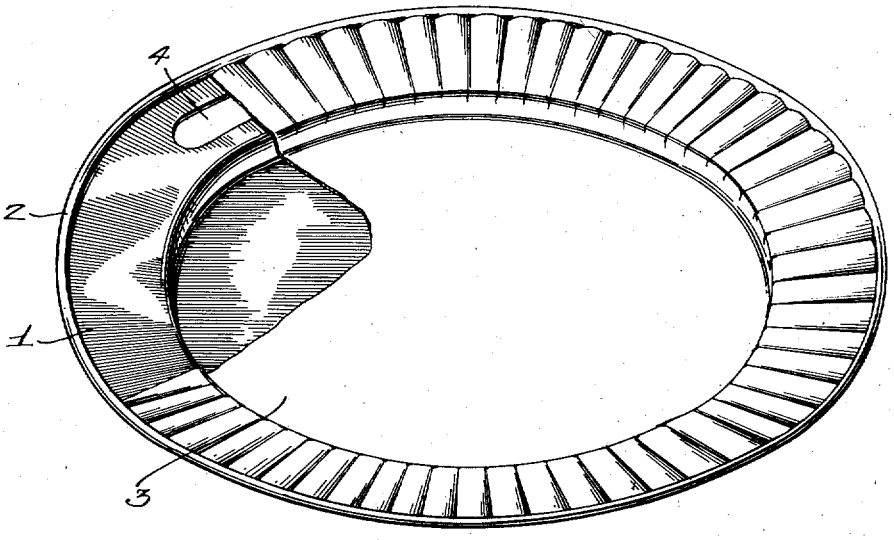
Figure 2:
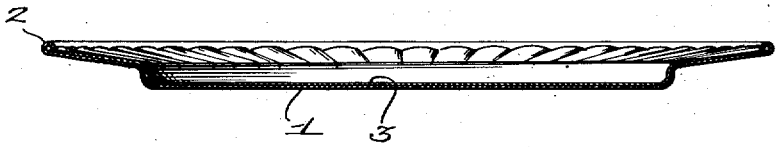

In the attached drawing:

Figure 1 is a view in perspective of a plate made in accordance with my invention, and Figure 2 is a transverse sectional view of the plate assembly.

With reference to the drawing, a preferred embodiment of my invention comprises a base member 1 which may conform generally in shape and size to a standard plate. This may be formed of any suitable material, such for example as sheet metal. At the marginal edge, this member is provided with a shallow upstanding rim 2, which in the present instance is formed by beading the edge inwardly as shown in Fig. 2. Regardless of the manner in which this rim is formed, it preferably shall be slightly inclined on the inside toward the center of the plate, and where sheet metal is used in the production of this member, the beading method is desirable by reason not only that it possesses inherently this inclined formation but that it also provides a smooth surface free from sharp cutting edges. It will be noted that the bead 2 is completely closed so that there are no pockets or crevices in which dirt or foodstuffs may accumulate or adhere.

In conjunction with this base member, I employ a cover element 3 shaped to fit the upper surface of the base member 1 inside of the rim 2. This cover element may suitably be made of thin paper, and while not essential, it is preferably scalloped or corrugated in the edge portion as illustrated. The element 3 is so dimensioned that when placed upon the base member, as illustrated, the peripheral edge of the cover element will bear with light pressure against the inner side of the rim 2 affording sufficient frictional pressure to maintain the cover element securely in position, while at the same time permitting ready release of the element when it is desired to separate it from the base member. To further facilitate removal of the cover element, the base member 2 may be provided as shown in Fig. 1 and in the peripheral portion thereof with an opening 4 through which an implement or the finger may be inserted from the under side of the base member to elevate the edge of the cover element from the said member.

It will be noted that the rim 2 has only sufficient height to afford the aforesaid frictional contact with the edge of the cover element relied upon to retain the latter securely in position, and that it does not project appreciably above the cover when the latter is in place. I have found that in this manner an effective bond between the cover and the base member may be had while the latter is largely concealed. When the cover element is suitably decorated, the plate has to a degree the appearance of a china plate and the same characteristics of substantial rigidity which is essential for proper handling.

I claim:

1. In a receptacle of the character described, a substantially rigid base member having a flat bottom, a shallow upstanding flange projecting from the peripheral edge of said bottom, a relatively wide flange projecting substantially horizontally from the upper edge of said upstanding flange and terminating in a narrow upstanding rim, a thin flexible covering element of substantially the same shape and size as the base member formed to cover and snugly fit the upper surface of the base member and having a central depressed portion, the side walls of said depressed portion engaging the inner walls of the upstanding flange of the base member, the peripheral portion of the covering element being radially corrugated and having the outer edge thereof frictionally fitting against the inner surface of the upstanding rim, said rim being of substantially the same height as the effective height of the corrugated peripheral portion of the covering element, whereby the base member is substantially concealed by the covering element and said rim forms a narrow unobtrusive margin at the outer edge of the assembly.

2. In a receptacle of the character described, a substantially rigid base member having a flat bottom, a shallow upstanding flange projecting from the peripheral edge of said bottom, a relatively wide flange projecting substantially horizontally from the upper edge of said upstanding flange and terminating in a narrow upstanding rim, a thin flexible covering element of substantially the same shape and size as the base member formed to cover and snugly fit the upper surface of the base member, the peripheral portion of the covering element being radially corrugated and having the outer edge thereof frictionally fitting against the inner surface of the upstanding rim, said rim being of substantially the same height as the effective height of the corrugated peripheral portion of the covering element, whereby the base member is substantially concealed by the covering element and said rim forms a narrow unobtrusive margin at the outer edge of the assembly.

HENRY HILL COLLINS.